Aug. 6, 1935.  S. S. GREEN  2,010,047
APPLIANCE METER
Filed Feb. 21, 1935
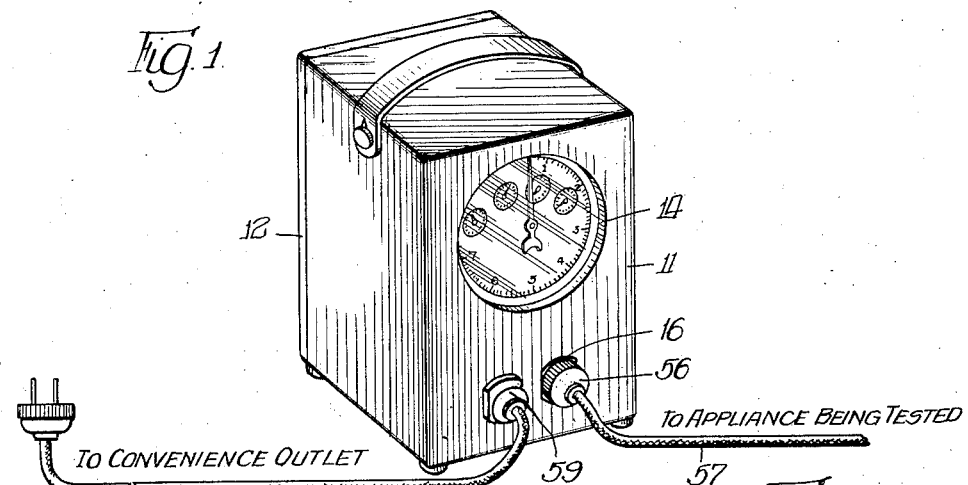
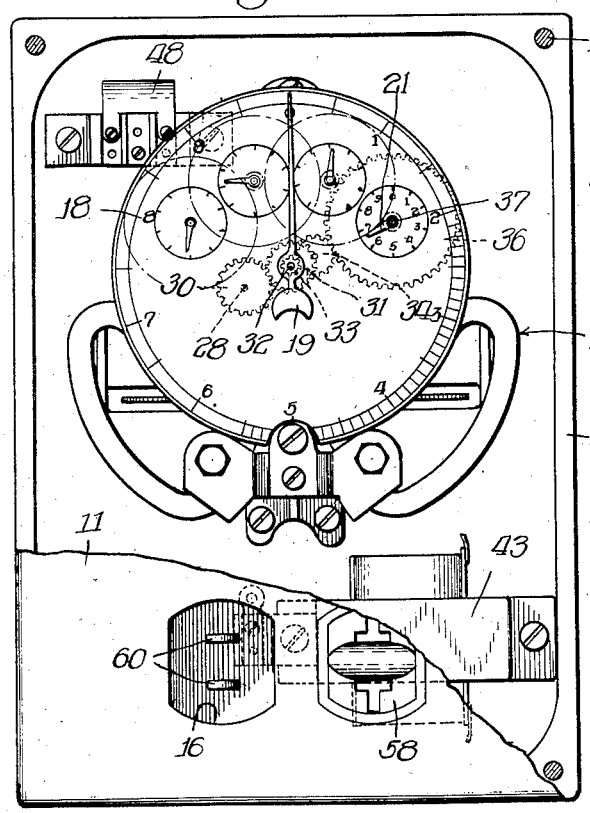
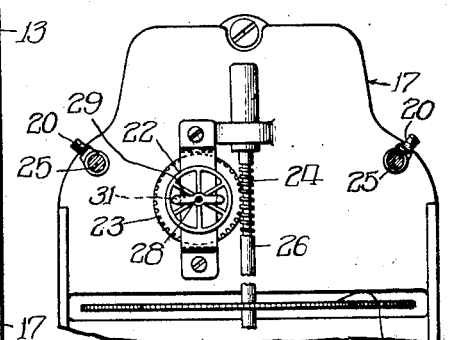
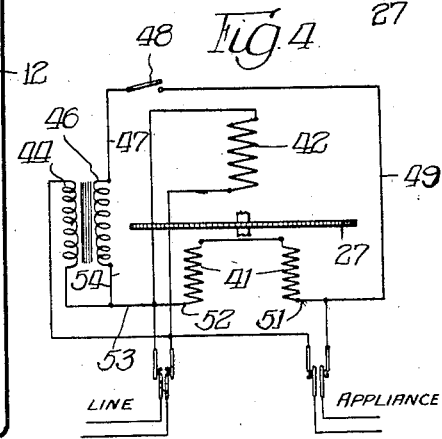
Inventor:
Stanley S. Green,
By Louis Robertson
atty Patented Aug. 6, 1935

2,010,047

UNITED STATES PATENT OFFICE 2,010,047

APPLIANCE METER

Stanley S. Green, La Fayette, Ind., assignor to Duncan Electric Mfg. Co., La Fayette, Ind., a corporation of Illinois Application February 21, 1935, Serial No. 7,479

12 Claims. (Cl. 171—34)

This invention relates to appliance meters and more in particular to watt-hour meters especially suitable for measuring the electric power consumed by a single appliance or single circuit having a relatively low load. The preferred form of the invention is capable of use in other connections, however.

Dealers in electric appliances frequently have complaints that the appliance they have sold uses too much electricity. Likewise they rarely convince a prospective buyer that the appliance will use as little current as they say it will. In both of these situations a convenient means of proof would be very desirable.

The need for this means of proof has existed for many years, but before this invention no satisfactory means of proof had been provided. A meter for indicating the momentary rate of consumption of power, and known as an "indicating meter" was not usually satisfactory for two reasons. First, because it registered only the momentary consumption it would be of little value for use with an intermittently running appliance such as an electric refrigerator. Second, due to the nature of such "indicating meters" they are not accurate over a large range of values. The use of an ordinary kilowatt hour meter as used in houses would not be satisfactory because these meters are not calibrated in small enough units, are hard to attach, and in fact beyond the skill of most home owners, have bases which must be hung on a wall, are geared too low for quick indications, have no zeroizing control, and, possibly most important of all, are designed to measure accurately up to 15 or 20 amperes, and therefore cannot measure accurately as low as is desired for the purpose in mind. For example, the ordinary electric house meters often will fail to start under the slight load of an electric clock.

Even the standard meters used for testing meters and which are commonly portable would be unsatisfactory for testing appliances, for they all work on the principle of comparing or observing the speed of the meter disc or an indicator rotating at the same speed. Their use for appliance testing would require constant counting, accurate timing, and then calculations. At heavy loads the meter disc rotates so fast that counting is rather difficult.

The present invention satisfies the long existing want of a meter which is practical and satisfactory for testing the consumption of power by a single electric appliance. It is perhaps misleading to say that the invention consists in certain features, for an important part of the invention was in analyzing the problem and determining just what features were needed.

These features which are needed for complete satisfaction and which are provided, are: a watt-hour meter in a standing case which may be set on a floor or table; facilities for easily connecting it, as by plugging its cord into the wall and plugging the appliance cord into it; a meter accurate for lower current values, and which will start on low currents such as that used by a clock, both of these features being attainable for example by doubling the number of turns in the current coil; indicating means which moves slower than the disc but fast enough to permit large scale calibrations in watt-hours and preferably in fractions thereof; and finally an inexpensive zeroizing device for setting the first indicator to zero, as by driving this indicator without disturbing the gearing between it and the other indicators. It is also preferred that back lash be eliminated as by balancing the rotating parts and by making the zeroizer keep the parts in normal driving engagement.

Other advantages and objects will be apparent from the following description taken with the drawing, in which:

Fig. 1 is a perspective view of the form of the invention chosen for illustration.

Fig. 2 is a view of the structure shown in Fig. 1 with portions of the case removed or broken away and indicating some of the internal features of construction.

Fig. 3 is a fragmentary detail view illustrating a portion of the gearing not shown in Fig. 2.

Fig. 4 is a circuit diagram of the meter.

Although this invention may take several forms, only one has been chosen for illustration. In this form a suitable casing is provided which may comprise a cast aluminum body portion 11 and a back 12 which may be secured together in any manner as by suitable screws 13. The casing may be provided with rubber feet as shown, or it may simply stand on its large flat bottom. The front member of the body portion is provided with a suitable opening 14 through which the dial of the meter may be visible and which is preferably closed by a sheet of glass. The body portion 11 may also have in its front member or elsewhere, one or more openings 16 through which the attachment plugs may be passed. Although the openings 16 are shown in the front for the purpose of illustration, they will probably be in the back member 12 as a matter of commercial practice, so that all the electric structure may be mounted on the back and therefore the body 11 of the casing may be entirely removed without disconnecting any wires.

Preferably mounted on the back member 12, as stated, is a meter element indicated generally by the reference numeral 17. This element may be identical with present commercial elements except for minor changes. The indicating or registering portion of the meter, which includes the face 18, large hand 19, small hands 21, and most of the gear train for driving said hands is considerably changed. Inasmuch as this portion of the meter is usually entirely separable from the rest of the meter simply by loosening two screws 20, these changes do not affect the production of the main portion of the meter element. It is the usual practice, at least on the part of one manufacturer of meters, to include in the main portion of the meter from which the indicating portion is separable, a spoked wheel 22 fixed on a shaft (not shown) to which is fixed a worm gear 23, which worm gear is rotated by a worm drive 24 formed on the shaft 26 which carries the meter disc 27. The indicator assembly is provided with a shaft 28 extending rearwardly therefrom and carrying at its end suitable means for engaging the spoked wheel 22 to be rotated thereby. According to the present invention this means comprises a bar 29 fixed on the back end of shaft 28 and having at the ends thereof rearwardly extending lugs 31 (indicated in dotted lines only in Fig. 3). These lugs extend between the spokes of the wheel 22 to be turned thereby without interfering with the removal of the whole integrator structure by loosening the two screws 20 engaging the support stubs 25 of the integrator structure. It should be noted that this coupling structure is balanced in weight about the shaft 28. The purpose of this is to eliminate any variations in readings due to back lash.

Fixed on the shaft 28 near its other or front end, is a gear 30 which meshes with the gear 31 carried on a shaft 32 on which is also fixed the large hand 19 and an additional gear 33. The large hand 19 is of course located in front of the dial 18 which is calibrated from 1 to 19, each unit preferably being divided into 10 (i. e. 1 to 0) spaces as indicated. Meshing with the gear 33 is an intermediate gear 34 which drives a large gear 36 fixed on a shaft 37 which carries the small hand 21. The remaining small hands are successively geared to the hand 21 as is the usual manner in integrators, each successive hand turning at $\frac{1}{10}$ the speed of the preceding hand so that each of the various hands indicates one digit of the reading.

It will be noted that the large hand 19 is in nearly a direct drive relation with respect to the shaft 26, and as a matter of fact in the illustrated form it is driven slightly faster than this shaft. This is in great contrast with the ordinary meter indicating assembly in which the first hand of the integrator is at the end of a train of gears which reduces the speed many times. As a matter of fact the first hand of the ordinary meter integrator indicates kilowatt hours, whereas the hand 19 indicates watt hours. It follows that if the ordinary integrator were used for testing the consumption of power by a single appliance, weeks or months would usually be required to determine the consumption with reasonable accuracy. With the present structure, however, the consumption can be determined with reasonable accuracy in only a few minutes if the power is constant, and a few days at the most, even with an intermediately operating device such as an electric refrigerator.

As a matter of fact, an additional scale of calibrations, perhaps in a different color, may be provided to indicate after say ten minutes measurement, the kilowatt hours that would be consumed in a month. The standard meter element provided with the indicator disclosed above will give very good satisfaction for testing the power consumption of a single appliance unless this power consumption is extremely low. Otherwise no change in the operating element, or the electrical portion of the meter element is necessary, and even for low power measurement only one change is desired. This change is simply to provide the current coils 41 of the meter with twice the number of turns of the present smallest capacity household kilowatt-hour meters. Thus, while the smaller of the present household or service type meters are rated as 5-ampere meters, the present meter will be rated as a 2½-ampere meter. In neither case does this mean that the rated amperage is all that can be carried, for it is now common to make meters which are reasonably accurate to 300% or 400% of their rated capacity, and which can carry such an overload constantly. The rated capacity, therefore, is simply a term which has grown up in the industry as indicating the relative capacities and fields of use of the various meters. For the sake of greater definiteness is may be stated that the applicant contemplates using a series or current winding of 48 turns, 24 on each core, approximately twice the number which is used on the present 5-ampere service meters. Of course slight departures from this preferred number would be almost immaterial if the gearing, calibrations, or other flux values were changed accordingly.

It is obvious that by providing twice the number of turns in the current winding as has been the practice heretofore, the given current value will cause the meter disc to run twice as fast as heretofore, but, more important still, will excite twice the torque on the meter disc, so that the meter disc of this invention may be started by current only half as great as that required to start the meter disc of the prior meters. Furthermore, doubling the number of turns in the current coil greatly increases the accuracy of the meter for lower power consumption. It so changes the characteristics of the meter that the separate power consumptions of nearly all household appliances are on the straight part of the accuracy curve.

For convenience in using meters of this type in testing individual appliances, it is preferred to have a zeroizing device. It would be possible of course to provide slip clutches between the various hands, so that all of them can be zeroized, but one of the features of this invention is to zeroize only the first integrator hand, that is the large hand 19. It has been discovered that this is sufficient for the purpose, since it eliminates fractional watt-hours and reduces the number of digits which need to be remembered in short tests to two, the third figure always being zero. It should be explained that in short tests the power consumption will rarely if ever reach a thousand watt-hours. The heavy current consumers are heating devices, for which a measurement of even ten minutes is usually fairly accurate.

It is also preferred that the zeroizing device should operate in such manner as to always keep the various gears in driving relationship. Thus if the hand is turned directly it would be preferred that it be turned backwardly against the gears, for if it were turned forwardly, then when the meter was first started the gears would rotate slightly before rotating the hand, for there would always be a certain amount of back lash that could be taken up.

This invention eliminates the effect of back lash by balancing all of the parts sufficiently so that they move only when driven and by zeroizing the meter by the simple and inexpensive expedient of driving the meter forward fairly fast until the hand reaches zero. The circuit for accomplishing this, and the connections of the meter are illustrated in Fig. 4. The potential coil 42 of the meter is connected across the line in the usual way as indicated. The current coil 41 is connected in series with one side of the line in the usual way. According to the present invention there is also provided a transformer 43 with a primary coil 44 connected across the line ahead of the current coil 41 as illustrated, so that the current flowing through the coil 44 is not indicated on the meter. The low voltage secondary coil 46 of the transformer is connected through the wire 47, the switch 48, the wire 49, and the wire 51 to the current coils 41, the other side of which is connected to the coil 46 by the wires 52, 53 and 54. When the switch 48 is closed as by means of a push button extending through the back of the meter, the voltage induced in the secondary coil 46 causes a fairly heavy current to flow through the current coils 41, thereby causing the meter disc to rotate at a fairly good speed. As the hand 19 approaches zero the push button is released, allowing the switch 48 to open, stopping the meter disc (assuming that there is no other load on the meter). The current should not be high enough to make the meter disc operate so fast as to be difficult to stop on zero.

The meter is attached simply by plugging its attachment cord 55 into the wall outlet or other connection from which the plug 56 of the appliance cord 57 has been removed. The plug 56 is plugged into the jack or convenience outlet 58 exposed through one of the holes 16. The term "convenience outlet" may be interpreted to include any jack, socket or like attachment means, though the preferred form is that illustrated. For convenience in shipping or carrying, the attachment cord may be removable from the meter by virtue of the plug members 59 and 60. The male members 60 are preferably on the meter so that they will not be exposed while connected to the line, and may be entirely within the casing 11.

The operation of the meter may be briefly reviewed as follows:

The plug 56 attached to the appliance is removed from its regular attachment point and the plug of the meter cord 55 is attached in its place, the meter cord 55 being attached to the meter as shown in Fig. 1. The plug 56 is then plugged into the meter jack 58. The push button on the back may then be pushed to close the switch 48 to run the meter releasing the push button to stop the large hand 19 at zero. After a reading of the meter has been taken and the time noted, the appliance is turned on. The measurement may be accurately timed for a few minutes or hours, or it may last a month. At the end the reading is again taken and the former reading is subtracted from it, giving the watt hours consumed during the measurement. The kilowatt hours consumed in any length of time may then be computed by simple arithmetic.

Although but one form of my invention has been herein shown and described, it will be understood that I am not limited thereby, but limit my invention only by the scope of the appended claims.

I claim:

1. A watt-hour meter suitable for the convenient testing of individual appliances comprising a standing case, a watt-hour meter element within said case including line connections, output connections, a meter disc, a current coil, an integrator having a relatively large hand which is geared to the meter disc to rotate at a speed not less than one-hundredth nor more than one-half the speed of the latter, a dial calibrated in fractional watt hours, and a transformer having a primary coil connected across the line connections, and a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter.

2. A watt-hour meter suitable for the convenient testing of individual appliances comprising a standing case, a watt-hour meter element within said case, including line connections, output connections, a meter disc, a current coil having approximately twice the number of turns of the smallest capacity service type kilowatt-hour meter heretofore used, an integrator having a relatively large hand which is geared to the meter disc to rotate at a speed not less than one-hundredth nor more than one-half the speed of the latter, a dial calibrated in fractional watt-hours, and a transformer having a primary coil connected across the line connections, a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter.

3. A watt-hour meter suitable for the convenient testing of individual appliances comprising a standing case, a watt-hour meter element within said case including line connections, output connections, a meter disc, a current coil having approximately 48 turns, an integrator having a relatively large hand which is geared to the meter disc to rotate at a speed not less than one-hundredth nor more than one-half the speed of the latter, a dial calibrated in fractional watt hours, a transformer having a primary coil connected across the line connections and a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter.

4. A watt-hour meter suitable for the convenient testing of individual appliances comprising a standing case, a watt-hour meter element within said case including line connections, output connections, a meter disc, a current coil, an integrator having a relatively large hand which is geared to the meter disc to rotate one revolution for each ten watt-hours, a dial calibrated in fractional watt-hours, and a transformer having a primary coil connected across the line connections, and a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter.

5. A watt-hour meter suitable for the convenient testing of individual appliances comprising a standing case, a watt-hour meter element within said case including line connections, output connections, a meter disc, a current coil, an integrator having a hand which is geared to the meter disc to rotate one revolution for each ten watt-hours, a dial calibrated in watt-hours, a transformer having a primary coil connected across the line connections and a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter.

6. A watt-hour meter suitable for the convenient testing of individual appliances comprising a standing case, a watt-hour meter element within said case including line connections, output connections, a meter disc, a current coil, an integrator having a relatively large hand which is geared to the meter disc to rotate at a speed not less than one-hundredth nor more than one-half the speed of the latter, a dial calibrated in watt-hours, a transformer having a primary coil connected across the line connections, a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter, said current coil and the other parts of the meter having such characteristics that the normal maximum load of any single common home appliance is substantially the full capacity of the meter, and such that the meter will start on a power consumption of approximately three watts.

7. A watt-hour meter suitable for the convenient testing of individual appliances comprising a standing case, a watt-hour meter element within said case including line connections, output connections, a meter disc, a current coil, an integrator having a hand which is geared to the meter disc to rotate at a speed not less than one-hundredth nor more than one-half the speed of the latter, a dial calibrated in watt-hours, a transformer having a primary coil connected across the line connections, and a low voltage secondary coil connectable across the current coil of the meter for zeroizing the first hand of the integrator, a flexible cord provided with a plug for connecting the line connections of said meter to a convenience outlet, and a convenience outlet connected to the output connections of said meter, said current coil and the other parts of the meter having such characteristics that the normal maximum load of any single common home appliance is substantially the full capacity of the meter, and such that the meter will start on a power consumption of approximately three watts.

8. A portable watt-hour meter suitable for the convenient testing of individual appliances comprising a standing case, a watt-hour meter element within said case including line connections, output connections, a meter disc, a current coil, an integrator driven by the meter disc at reduced speed and provided with markings to indicate fractional kilowatt hours, and a transformer having a primary coil connected across the line connections, and a low voltage secondary coil connectable across the current coil of the meter for zeroizing the integrator, a flexible cord provided with a plug for connecting the line connections of said meter to a convenience outlet, and a convenience outlet connected to the output connections of said meter.

9. A portable watt-hour meter suitable for the convenient testing of individual appliances comprising a standing case, a watt-hour meter element within said case including line connections, output connections, a meter disc, a current coil having approximately 48 turns, an integrator driven by the meter disc at reduced speed and provided with markings to indicate fractional kilowatt hours, a transformer having a primary coil connected across the line connections, a low voltage secondary coil connectable across the current coil of the meter for zeroizing the integrator, a flexible cord provided with a plug for connecting the line connections of said meter to a convenience outlet, and a convenience outlet connected to the output connections of said meter.

10. A portable watt-hour meter for measuring appliance loads comprising a standing case with a carrying handle, a single phase watt-hour meter element mounted in said case, a register and integrating dial for said element having a plurality of indicators in decimal geared relationship, a flexible cord provided with a plug for connecting the line connections of said meter to a convenience outlet and a convenience outlet connected to the outlet connections of said meter, said meter element having a current electromagnet winding of at least approximately 40 turns and such that its full overload capacity at which it is capable of accurate and continuous measurement is at least as low as approximately ten amperes, said indicators including one relatively large fast-moving hand capable of being read against the dial in small fractions of a kilowatt-hour but which is geared to rotate slower than the meter element disc and means having an operating member readily accessible from the exterior of the case for moving all the indicators on said dial to any desired position without disturbing their mutual geared relationship.

11. A portable watt-hour meter for measuring appliance loads comprising a standing case with a carrying handle, a single phase watt-hour meter element mounted in said case, a removable register and integrating dial for said element having a plurality of indicators in decimal geared relationship, a flexible cord provided with a plug for connecting the line connections of said meter to a convenience outlet and a convenience outlet connected to the outlet connections of said meter, a shunt connected to one wire of said cord and forming one of the said outlet connections, said meter element having a current electromagnet winding of at least approximately 40 turns and such that its full overload capacity at which it is capable of accurate and continuous measurement is at least as low as approximately ten amperes, said indicators including one relatively large fast-moving hand capable of being read against the dial in small fractions of a kilowatt-hour but which is geared to rotate slower than the meter element disc and means having an operating member readily accessible from the exterior of the case for moving all the indicators on said dial to any desired position without disturbing their mutual geared relationship.

12. A portable watt-hour meter for measuring appliance loads comprising a standing case with a carrying handle, a single phase watt-hour meter element mounted in said case and having attachment fittings for a readily removable register, a register and integrating dial for said element secured to said fittings and having a plurality of indicators in decimal geared relationship, a flexible cord provided with a plug for connecting the line connections of said meter to a convenience outlet and a convenience outlet connected to the outlet connections of said meter, a shunt connected to one wire of said cord and forming one of the said outlet connections, said meter element having a current electromagnet winding such that it is capable of accurate and continuous measurement at approximately ten amperes and less, said indicators including one relatively large fast-moving hand capable of being read against the dial in small fractions of a kilowatt-hour but which is geared to rotate slower than the meter element disc and means having an operating member readily accessible from the exterior of the case for moving all the indicators on said dial to any desired position without disturbing their mutual geared relationship, and without affecting the accuracy of the meter.

STANLEY S. GREEN.